Figure 1:
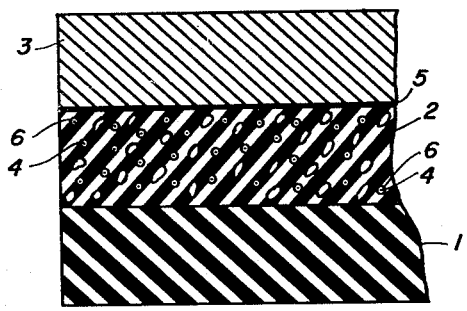

Jan. 7, 1964    R. M. ANTONUCCI    3,117,054
COATING FOR THE ABSORPTION OF VIBRATIONAL ENERGY
Filed June 28, 1960

INVENTOR.
RENALDO M. ANTONUCCI
BY
ATTORNEYS

3,117,054
COATING FOR THE ABSORPTION OF VIBRATIONAL ENERGY
Renaldo M. Antonucci, 780 4th Ave., San Francisco 18, Calif.
Filed June 28, 1960, Ser. No. 39,414
5 Claims. (Cl. 161—160)
(Granted under Title 35, U.S. Code (1952), sec. 266)

The invention described herein may be manufactured and used by or for the Government of the United States of America for governmental purposes without the payment of any royalties thereon or therefor.

The present invention relates to materials for damping structural vibrations such as the vibrational energies of motors, machinery, airplanes, sea-going vessels and the like.

As will be recognized, vibrational damping materials have been used for many purposes and a wide variety of rather successful treatments or coatings have been developed. For the most part, however, the treatments have been somewhat limited in their effectiveness principally because of an inability to absorb high energy levels over a relatively wide range of frequencies. In fact, most of these coatings have quite low energy absorption at the low frequencies, although some coatings have been designed particularly for certain frequencies and are capable of demonstrating peak absorption within a critical range. A further deficiency of a number of the earlier vibration damping coatings or treatments has been the fact that their structure being of rock wool, felt, fibre glass, cork and so forth, necessarily had to be quite thick and therefore not only difficult in application and maintenance but also rather space-consuming.

On the other hand, some rather promising work has been accomplished utilizing a coating formed of a solid butyl rubber layer disposed as a laminate over a cellular butyl rubber layer, these layers then being cemented or otherwise bonded to the structure to be dampened. In this work it has been found that, when the ratio of the solid material to the gas of the cellular layers is correct, a condition is reached in which the coating itself is, in effect, tuned so as to provide very acceptable absorption of energy over a range of frequencies. Also, it has been found that the use of a thin metal cover over the butyl layers provides supplementary advantages in permitting an improved energy absorption as well as a greater range of frequencies. In general, such coatings apparently achieve their purposes by converting the vibrational energy into heat, the heat being generated due to the fact that the masses have a relative movement due to their different vibrational frequencies. In other words, the heavier and lighter masses have different frequencies of vibrational movement so as to set up a shear action which in turn, produces the heat which, of course, is the evolutionary stage of the vibrational energy being received.

Although the solid butyl-cellular butyl-metal cover coating just described is an important and advantageous concept, it nevertheless presents some difficulties particularly in the practicality of the metal cover plate, as well as the fact that such a plate further increases thickness as well as weight. When such a coating is used for objects such as submarines or airplanes where weight and space considerations are critical, the difficulty is emphasized.

At this point, it may be said that the present invention is principally concerned with these butyl rubber-metal cover coatings, although, in a more general manner, it will become apparent that the invention has broad applicability and advantage when incorporated in any coating having a relatively compliant layer.

It therefore is an object of the present invention to provide an improved treatment or coating for damping structural vibrations.

A more specific object is to provide an improved energy absorption coating of the type employing a compliant layer, a relatively rigid layer and a heavy material such as a metal.

Another object is to provide an energy absorption treatment of minimum thickness and weight.

Other objects will become apparent in the detailed description which is to follow.

According to the present invention, the objects are achieved primarily by embedding grease or oil coated metal particles in the compliant layer of the coatings such as those previously described. In other words, the coating of the present invention includes the compliant layer, which, most suitably, is a cellular butyl rubber layer, a relatively rigid layer, such as the solid butyl rubber layer, and grease or oil coated particles embedded in and distributed throughout the compliant layer. In the preferred form, the particles are in the form of metallic powder, flakes or the like, while the oil or grease which, if desired, may be compounded in the compliant material itself, is a silicone oil.

Functionally, a coating of this general type achieves its objectives by permitting a stiffness tuning as well as a resistance tuning and, although this particular tuning concept is not a part of the invention and need not be fully understood for the practice of the invention, it can be briefly considered. Thus, according to prevailing teachings, stiffness tuning of a coating for a certain frequency can be achieved by arranging a proper ratio of the stiff and compliant elements in the coating. Also, because of the presence of the lubricant and the high loss factor compliant element, the coating will have a high level energy conversion and, if the proper mass is used, the coating then will be resistance tuned over a frequency range. Also, since the elements can be selected and their masses closely apportioned, the stiffness tuned frequency can be brought within an octave of the resistance tuned frequencies so as to provide the high level energy conversion over a broad range of frequencies.

In the present invention, the important factor resides in the use of the lubricant film about the metal particles and this factor is of significance not only because of the high loss factor of the lubricant film, but also because of the relative movement of the metal particles with respect to the film. Thus, it may be noted that, when a coating of the type described is applied to vibrating panels or the like, the metal particles, because of their relative inertial resistance with respect to their surrounding compliant layer, tend to move in relation to the compliant layer, thus producing a shear action in the film of oil surrounding these metal particles. This shear action, in turn, is significantly instrumental in converting the vibrational energy to heat and thereby damping the vibrations of the moving part.

Figure 2:
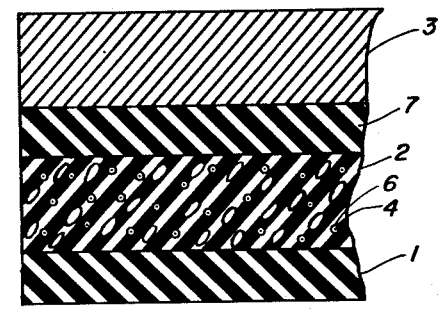

Preferred embodiments of the invention are illustrated in FIGS. 1 and 2, FIG. 1 showing a coating having one solid rubber layer, and FIG. 2 another coating showing top and bottom solid rubber layers: the principles of the present invention being incorporated in each modification in an identical manner.

Referring to the drawings, it may be noted that the coating of FIG. 1 is formed of an outer layer 1 of solid butyl rubber, this layer in the preferred form being approximately 30 mils in thickness. Adhered to outer coating 1 by vulcanization or other suitable adhesive means, is a compliant layer 2 which, preferably, has a thickness of 30 mils and is formed of a cellular butyl rubber having a gas content of approximately 0.012 cubic inch per square inch of the coating. Finally, these two coatings are adhered to a surface 3 of the object to be dampened and, for this purpose, any suitable adhesive 5 can be employed. Adhesives that have been successfully used include a B. F. Goodrich Company's composition registered under the name "Vulcalock" and Goodyear Tire and Rubber Company's Pliobond 20, also a registered mark. Vulcalock is a thermoplastic cement used principally for sealing rubber to metals, while Pliobond 20 is a bonding adhesive for metals, plastics, fabrics, ceramic ware, vulcanized rubber, paper, etc. The latter composition further is described as an adhesive that is soluble in acetone, methylethyl ketone and lacquer solvents for application by brushing, spraying or other conventional modes. If desired it can be used as a cold-setting adhesive and its bond is flexible and resistant to moisture and dilute acids. These two adhesives, Vulcalock and Pliobond 20, both are specific examples of a general class of rubber cements which are widely used for purposes related to those of the present invention. In actual practice, such a coating also may employ layers of duck or the like used to facilitate manufacture, although such refinements are not of present significance since, except as otherwise will be noted, the invention is not predicated upon the aforementioned elements of the coating.

The significant feature of the invention is the fact that metal particles 4 are embedded in and distributed throughout compliant layer 2, these particles each being coated with an oil or grease film identified in the drawing by numeral 6. FIG. 2 illustrates basically the same structure although, as will be noted, FIG. 2 includes an inner solid butyl rubber layer 7. In certain applications of the coating, this bottom layer may be advantageous, although it is presently shown principally to demonstrate the fact that various types of coatings may be employed without departing from the principles of the present invention. In this regard, it again is emphasized that the invention advantageously can be employed in any coating which utilizes a compliant layer in laminated relationship to a solid layer. In fact, as will be appreciated, the present invention primarily is concerned with the incorporation of the grease-coated metal particles in the compliant, preferably cellular, layer.

It has been noted that, preferably, particles 6 are metallic although rigid or stiff plastic or other materials could serve equally well. As seems readily understandable, the materials used for the particles can vary widely as long as the desired material is relatively rigid or stiff in relation to the compliant layer so as to vibrate with a substantially different frequency. In fact, this wide selectivity is quite advantageous in permitting the stiffness tuning previously mentioned. Litharge or lead shot has been employed although lighter aluminum flake is possible depending upon the other constituents. The oil or grease film surrounding the particles preferably is a silicone oil, although here again other materials could be substituted. As shown, each of the particles is coated with this film of silicone oil and, to accomplish this result, the particles may be pre-coated prior to being milled into the compliant layer compound, or, if desired, the oil can be milled directly into the compliant layer compound itself so as, in effect, to provide a film substantially surrounding each of the particles. In this latter instance, sufficient oil must be used to assure a film around the major portion of the particles.

Functionally, the coatings which have been described depend for their effectiveness first upon the proper proportioning of the stiff and compliant masses, such as the solid butyl layer and the cellular compliant layer. However, except as has been noted, this achievement of the proper ratio of these elements is not a part of the present invention which, instead, is related primarily to the benefits resulting from the use of the grease-coated metal particles embedded within the compliant layer. One particular advantage of embedding these grease-coated particles within the compliant layers is that the particles can supply a needed mass or weight to improve the damping properties of the coating without increasing the thickness of the coating in the manner which results when a solid metal cover is disposed as a layer over the butyl rubber elements. Further, the fact to be most heavily stressed, is that the particles themselves react to vibrations by moving relatively to the compliant cellular environment which, as has been stated, has a different inertial resistance from that of the metal particles. Consequently, when these particles so move, they exert a shear action upon the grease film and this action in turn releases the vibrational energy in the form of heat. Of equal importance, the loss factor (E2/E1) for a material of this type is particularly high because of the grease film. The high E2 of the grease film combined with the E2 of the compliant butyl rubber is so high in relation to the E1 of the combined system that high energy absorption occurs over a wide frequency range. As a result, when the advantages inherent in the grease-coated metal particles are combined with those inherent in the tuning of the masses of a coating, vibrational energy is absorbed in as effective a manner as presently seems possible.

Obviously many modifications and variations of the present invention are possible in the light of the above teachings. It is therefore to be understood that within the scope of the appended claims the invention may be practiced otherwise than as specifically described.

What is claimed is:

1. A laminate coating for damping structural vibrations, said coating comprising a laminate structure formed of a compliant layer, a relatively rigid layer coextensive with and adhered to said compliant layer, means for cementing one of said layers to the structure to be dampened, relatively rigid particles distributed throughout said compliant layer, and a fluid oil-like lubricant within said compliant layer, said damping being a function of the relative vibrational movements of said particles and their environment, said relative movement producing a shear action on said lubricant, and said lubricant being incorporated in sufficient quantity for assuring a condition in which said rigid particles are substantially surrounded by the lubricant.

2. The coating of claim 1 wherein said lubricant is in the form of a film carried by the particles.

3. The coating of claim 2 wherein said lubricant is a silicone oil.

4. The coating of claim 1 wherein said compliant layer is formed of a cellular butyl rubber, and said rigid layer is formed of a solid butyl rubber.

5. The coating of claim 4 wherein said particles are metallic.

References Cited in the file of this patent

UNITED STATES PATENTS

| 2,582,701 | Ikanyan | Jan. 15, 1952 |
| 2,720,495 | Phreaner | Oct. 11, 1955 |
| 2,734,812 | Robie | Feb. 14, 1956 |
| 2,766,800 | Rockoff | Oct. 16, 1956 |
| 2,806,509 | Bozzacco et al. | Sept. 17, 1957 |
| 2,822,539 | McMillan | Feb. 4, 1958 |
| 2,875,435 | McMillan | Feb. 24, 1959 |
| 2,956,281 | McMillan et al. | Oct. 11, 1960 |

FOREIGN PATENTS

| 412,923 | Great Britain | July 3, 1934 |